US007014941B2

(12) United States Patent
Chuang et al.

(10) Patent No.: US 7,014,941 B2
(45) Date of Patent: Mar. 21, 2006

(54) ELECTRODE CATALYST FOR $H_2S$ FUEL CELLS

(75) Inventors: Karl T. Chuang, Edmonton (CA); Jingli Luo, Edmonton (CA); Guolin Wei, Edmonton (CA); Alan R. Sanger, Edmonton (CA)

(73) Assignee: The Governors of the University of Alberta, Alberta (CA)

( * ) Notice: Subject to any disclaimer, the term of this patent is extended or adjusted under 35 U.S.C. 154(b) by 290 days.

(21) Appl. No.: 10/290,429

(22) Filed: Nov. 8, 2002

(65) Prior Publication Data

US 2003/0215697 A1 Nov. 20, 2003

Related U.S. Application Data

(63) Continuation-in-part of application No. 10/143,944, filed on May 14, 2002, now abandoned.

(51) Int. Cl.
*H01M 4/86* (2006.01)
(52) U.S. Cl. .............................. 429/40; 429/44; 429/13; 429/30; 502/100; 502/101; 204/280
(58) Field of Classification Search .................. 429/44, 429/46, 30, 13, 40; 502/100, 101; 204/280
See application file for complete search history.

(56) References Cited

U.S. PATENT DOCUMENTS

| 4,544,461 A | 10/1985 | Venkatesan et al. |
| 4,920,015 A | 4/1990 | Sammells |
| 4,933,054 A | 6/1990 | Mazanec et al. |
| 6,090,312 A | 7/2000 | Ziaka et al. |
| 6,099,983 A | 8/2000 | Nakagaki et al. |
| 6,241,871 B1 | 6/2001 | Donini et al. |
| 6,281,403 B1 | 8/2001 | White et al. |
| 6,287,432 B1 | 9/2001 | Mazanec et al. |
| 6,294,068 B1 | 9/2001 | Petrovic et al. |

2004/0086772 A1 5/2004 Chianelli et al.

OTHER PUBLICATIONS

Kueper, T.W. et al., "Thin-film ceramic electrolytes deposited on porous and non-porous substrates by sol-gel techniques", Solid State Ionics, 1992, pp. 251-259, vol. 52.
Peterson, D. et al., "A Hydrogen Sulfide Fuel Cell Using a Proton-Conducting Solid Electrolyte", J. Electrochem. Soc., Mar. 1996, pp. L55-L56, vol. 143, No. 3.
Kordesch, K. et al., "Fuel Cells and Their Applications", VCH, 1996, pp. 151, 333-336.
Liu, M. et al., "Performance of a solid oxide fuel cell utilizing hydrogen sulfide as fuel", Journal of Power Sources, 2001, pp. 20-25, vol. 94.
Michaels, J.N. et al., "Kinetics of Vapor-Phase Electrochemical Oxidative Dehydrogenation of Ethylbenzene", Journal of Catalysts, 1984, pp. 477-487, vol. 85.
Liu, D.H.F. et al, "Air Pollution", Lewis Publishers, 2000 pp. 154-180.
Chuang, K.T. et al., "A proton-conducting solid state $H_2S$-$O_2$ fuel cell. 3. Operation using $H_2S$-hydrocarbon mixtures as anode feed", International Journal of Hydrogen Energy, 2001, pp. 103-108, vol. 26.

*Primary Examiner*—Laura Weiner
(74) *Attorney, Agent, or Firm*—Bereskin & Parr; Patricia Folkins

(57) ABSTRACT

The present invention relates to an anode catalyst for use in the electrochemical oxidation of $H_2S$ to elemental sulfur and water, specifically in a fuel cell having an ion-conducting membrane. The catalyst comprises a material prepared from two or more metal sulfides of the formula $MS_x$, wherein M is selected from the group consisting of Co, Ni, Fe, Mo, Cu, Cr, W and Mn, and x is between about 1.0 and about 2.5; a conductive material suitable for fuel cell operation; and a porous material. The invention further provides methods of preparing the catalyst, fuel cells comprising the catalyst and methods of electrochemically oxidizing $H_2S$ using the catalyst.

23 Claims, 10 Drawing Sheets

I-V characteristics at 750 or 800 °C

I-P characteristics at 750 or 800 °C

I-V characteristics at 750 or 800 °C

I-P characteristics at 750 or 800 °C

Current density-voltage curves.

I-P curves at different

I-P curves for (MoS2+NiS+Ag+YSZ) anode

ELECTRODE CATALYST FOR H₂S FUEL CELLS

This application is a continuation-in-part of U.S. application Ser. No. 10/143,944, filed on May 14, 2002 which is now abandoned.

FIELD OF THE INVENTION

The present invention relates to catalysts for ion conducting fuel cells, specifically for the co-generation of elemental sulfur and electrical power from hydrogen sulfide.

BACKGROUND OF THE INVENTION

A majority of fuel cell systems developed to date use hydrogen and oxygen as anode and cathode feed respectively. Although hydrogen has a high energy density, a variety of alternative fuels have been investigated as fuels for transportation fuel cell systems, as they are safer to store and transport. In particular, methanol is the subject of several investigations (Kordesch and Simader, 1996, p. 151). Ammonia or hydrazine each has high power density, but requires safe handling (Kordesch and Simader, 1996, p. 333). Methanol or hydrocarbon fuels can be re-formed to hydrogen for use in standing or mobile power units (Kordesch and Simader, 1996, p. 297; Ziaka and Vasileiadis, 2000; Nakagaki et al., 2000). In each of these cases, the fuel is totally consumed for generation of hydrogen, that is then used to generate electrical power, and all carbon is converted to $CO_2$.

In principle, the free energy change for any chemical reaction can be converted to electrical energy in an oxide ion conducting fuel cell (Scheme 1), if the required characteristics are present. A similar set of equations can be drawn for a fuel cell having a proton conducting membrane (Scheme 2), such as polymer electrolyte membrane fuel cells (PEMFC). In each case, suitable anode and cathode materials must be used to catalyze reactions 1 and 2. Partial oxidation of $XH_2$ to X thereby provides free energy recoverable as electrical power.

Scheme 1

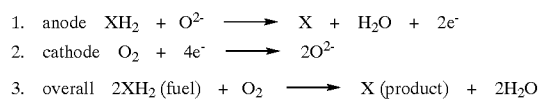

Scheme 2

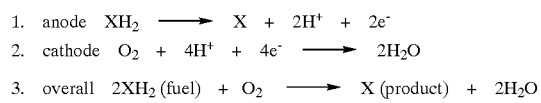

Any reaction in which a fuel ($XH_2$ in Eqns. 1 and 3, Schemes 1 and 2) is oxidized to a value-added product (X in Eqns 1 and 3, Schemes 1 and 2) and energy, is a potential candidate for application in a fuel cell for co-generation of chemicals and power. One example of such a process is the production of sulfur from hydrogen sulfide.

Potential benefits from use of fuel cell technology for production of chemicals include improved selectivity and efficiency. An economic advantage is that there is a negative cost of feed for production of electrical power, as the cost of fuel is more than offset by the value of the product. In the case of conversion of $H_2S$, the value of sulfur is not great. However, in this case use of a fuel cell-based process offers the potential economic advantage of reduced cost of treatment of sour gas streams. For other systems, for example when hydrocarbons are converted to products of significantly higher value, reduced cost for manufacturing the product can provide an economic incentive (Mazanec and Cable, 1990; Michaels and Vayenas, 1984; Petrovic et al., 2001; White et al., 2001)

$H_2S$ is a toxic and highly reactive pollutant. Removal of $H_2S$ from natural gas and process streams Is costly. The energy generated by oxidation of $H_2S$ to either sulfur, as in the Claus process, or $SO_x$ by combustion, is either vented or partly recovered as low-grade heat (Chuang and Sanger, 2000). There is a clear economic benefit to recovery of the heat of reaction of $H_2S$ to elemental sulfur as high-grade electrical energy.

Experimental SOFC's are known in which hydrogen sulfide can be oxidized; however no catalysts have yet been developed that are sufficiently active for fuel cell applications. In fact there are, at present, no commercial fuel cells for the production of sulfur from hydrogen sulfide.

SUMMARY OF THE INVENTION

The present inventors have shown that admixing a suitable conductive material, such as metallic silver (Ag), with a metal sulfide-based anode catalyst and then mixing this composite anode catalyst with about 5% of an oxide ion-conducting porous material, such as yttria-stabilized zirconia (YSZ), provides a composite anode catalyst which significantly improves performance of an $H_2S$—$O_2$ fuel cell having an oxide ion-conducting membrane. The catalyst will also work in a fuel cell having a proton ion-conducting membrane.

Accordingly, the present invention relates to an anode catalyst composition for a gas phase $H_2S$—$O_2$ fuel cell having an ion-conducting membrane comprising:

(a) two or more metal sulfides of the formula $MS_x$, wherein M is selected from the group consisting of Co, Ni, Fe, Mo, Cu, Cr, W and Mn, and x is between about 1.0 and about 2.5;

(b) a conductive material suitable for fuel cell operation; and (c) an ion-conducting porous material, wherein both of (b) and (c) are present in the composition in amounts up to about 10% by weight of the composition. A preferred ratio of (a):(b):(c) is about 90:5:5.

In a further aspect of the present invention there is provided a method of preparing an anode catalyst composition for a gas phase $H_2S$—$O_2$ fuel cell having an ion-conducting membrane comprising:

(a) combining two or more metal sulfides of the formula $MS_x$, wherein M is selected from the group consisting of Co, Ni, Fe, Mo, Cu, Cr, W and Mn and x is between about 1.0 and about 2.5, with a conductive material suitable for fuel cell operation; and (b) combining the combination of (a) with an ion-conducting porous material, wherein both of the conductive material and porous material are present in the composition in amounts up to about 10% by weight of the composition.

The present invention further relates to a fuel cell for the electrochemical oxidation of $H_2S$ to sulfur and water comprising an anode chamber on one side of an ion-conducting membrane and a cathode chamber on the opposing side of the ion-conducting membrane, said anode chamber having a catalytic anode and said cathode chamber having a catalytic cathode wherein said anode comprises a catalyst as defined above.

In an embodiment, the present invention further provides a process for the electrochemical oxidation of $H_2S$ to sulfur and water using a fuel cell having an anode chamber on one side of an oxide ion-conducting membrane and a cathode chamber on the opposing side of the membrane comprising the steps of:

(1) passing an $H_2S$-containing gas through the anode chamber to contact a catalytic anode, where it reacts with oxide ions to produce elemental sulfur, water and electrons;

(2) passing oxide ions through the membrane from the cathode chamber to the anode chamber; and (3) passing an oxygen-containing gas through the cathode chamber to contact the catalytic cathode, where it reacts with electrons to produce oxide ions, wherein said catalytic anode comprises a catalyst as defined above.

In a further embodiment, the present invention includes a process for the electrochemical oxidation of $H_2S$ to sulfur and water using a fuel cell having an anode chamber on one side of a proton ion-conducting membrane and a cathode chamber on the opposing side of the membrane comprising the steps of:

(1) passing an $H_2S$-containing gas through the anode chamber to contact a catalytic anode, where it reacts with oxide ions to produce elemental sulfur, protons and electrons;

(2) passing protons through the membrane from the cathode chamber to the anode chamber; and (3) passing an oxygen-containing gas through the cathode chamber to contact the catalytic cathode, where it reacts with protons and electrons to produce water or steam, or forming hydrogen in the cathode chamber, wherein said catalytic anode comprises a catalyst as defined above.

The present invention satisfies the need for an active and long-lived anode catalyst for $H_2S/O_2$ fuel cells. The anode catalyst of the present invention is stable enough to be used at temperatures that allow the formation of sulfur vapour at the catalyst sites, avoiding formation of liquid sulfur at the surface and consequent blockage of access to catalytic sites, thereby leading to higher long term efficiency.

Other features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The invention will now be described in relation to the drawings in which.

DETAILED DESCRIPTION OF THE INVENTION

Figure 1:
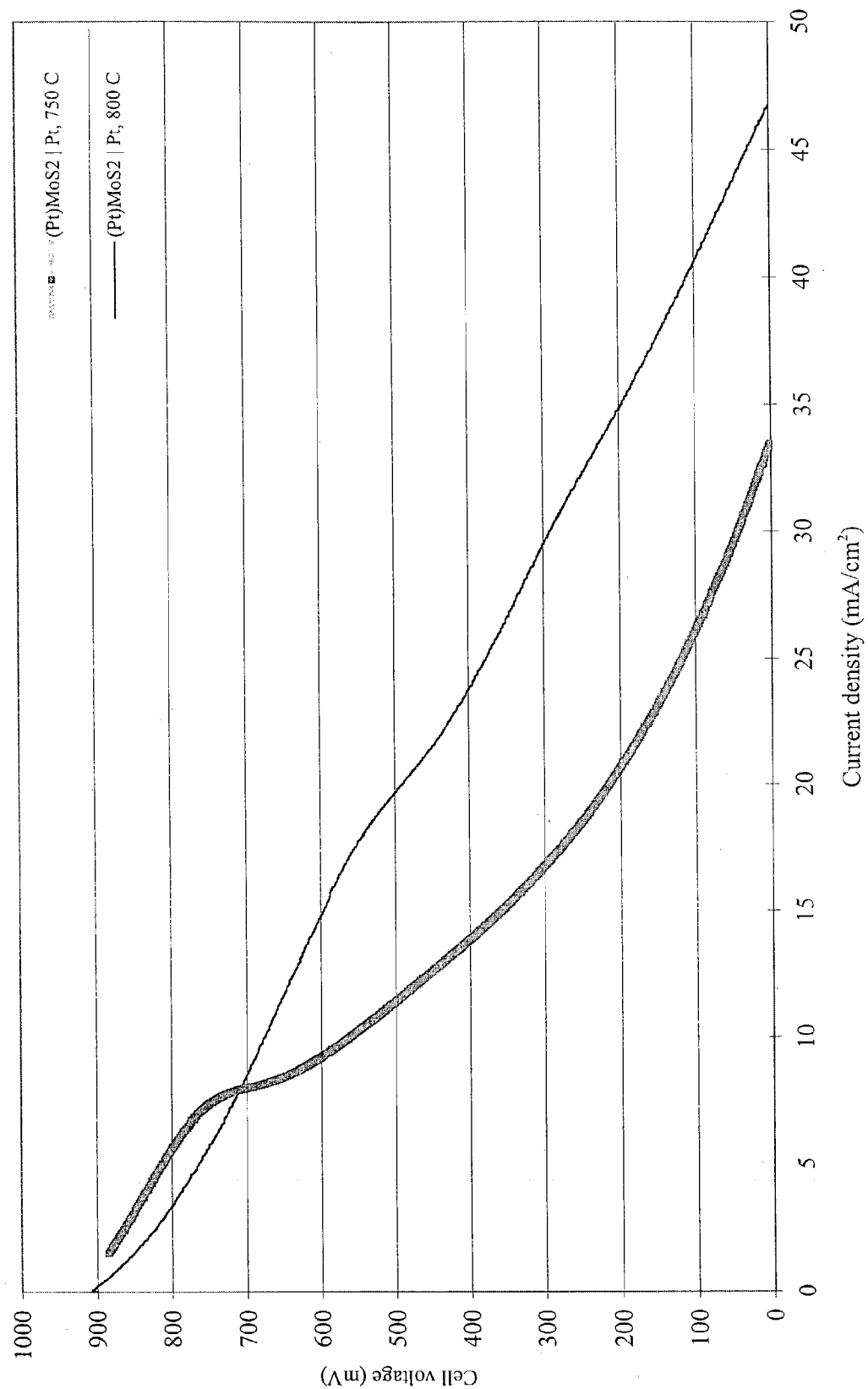
FIG. 1 is a graph of voltage as a function of current density for a fuel cell uitlizing the anode catalyst of Example 1.

The present inventors have performed systematic research on the development of optimum anode catalyst designs for gas phase $H_2S$—$O_2$ fuel cells having either a proton or oxide ion-conducting membrane. It has been found that by admixing a suitable conductive material, such as metallic silver (Ag), with a mixed-metal sulfide-based anode catalyst, and then mixing this composite anode catalyst with about 5% of an oxide ion-conducting porous material, such as yttria-stabilized zirconia (YSZ), significant improvements in the performance of a $H_2S$—$O_2$ fuel cell having an oxide ion-conducting membrane can be achieved.

Accordingly, the present invention relates to an anode catalyst composition for a gas phase $H_2S$—$O_2$ fuel cell having an ion-conducting membrane comprising:

(a) two or more metal sulfides of the formula $MS_x$, wherein M is selected from the group consisting of Co, Ni, Fe, Mo, Cu, Cr, W and Mn, and x is between about 1.0 and about 2.5;

(b) a conductive material suitable for fuel cell operation; and (c) an ion-conducting porous material, wherein both of the conductive material and the porous material are present in the composition in amounts up to about 10% by weight of the composition.

In embodiments of the invention, the fuel cell has an oxide ion conducting membrane or a proton ion conducting membrane. In preferred embodiments, the fuel cell has an oxide ion conducting membrane. When the fuel cell has an oxide ion-conducting membrane, an oxide ion-conducting porous material is used. Similarly, when the fuel cell has a proton ion-conducting membrane, a proton ion-conducting porous material is used.

As stated above, the anode catalyst comprises a mixed metal sulfide comprising two or more metal sulfides of the formula $MS_x$, wherein M is selected from the group consisting of Co, Ni, Fe, Mo, Cu, Cr, W and Mn, and x is between about 1.0 and about 2.5. In embodiments of the present invention, M is selected from the group consisting of Co, Ni, Fe, Mo, W and Mn. In a further embodiment of the present invention, the anode catalyst comprises two metal sulfides of the formula $MS_x$ wherein M is selected from the group consisting of Co, Ni, Fe, Mo, Cu, Cr, W and Mn, and x is between about 1.0 and about 2.5. In a specific embodiment, the anode catalyst comprises two metal sulfides, with one metal sulfide having M selected from the group consisting of Co, Ni and Fe and the second metal sulfide having M selected from the group consisting of Mo and W. In another embodiment of the present invention, the catalyst comprises NiS and $MoS_2$.

The mixed metal sulfide may be prepared by combining two or more metal sulfides, preferably in approximately equivalent amounts by weight. It will be recognized that the mixed metal sulfide may be formed by partially or completely sulfiding corresponding mixed metal oxides or similar compounds.

The conductive material may be any such material that is stable under the operating conditions required for the electrochemical oxidation of $H_2S$. Examples of metals and metal oxides useful as a conductive material would be well known to those skilled in the art and include silver, gold, nickel, bismuth, manganese, vanadium, platinum, rhodium, ruthenium, palladium, copper, zinc, cobalt, chromium, and iron metals and metal oxides, any mixtures of said metals and metal oxides, and other mixtures such as silver-bismuth oxide mixtures, tin-indium oxide mixtures, praeseodymium-indium oxide mixtures, cerium-lanthanum oxide mixtures, etc., and mixtures thereof. Among these, silver is preferred.

The ion-conducting porous material may be any such material that does not interfere with the reaction process. Examples of porous materials which are known to be ion-conducting are well known in the art. Porous materials known to be oxide-ion conducting include, but are not limited to, any of a large number of oxides, including yttria-stabilized zirconia (YSZ), doped ceria, thoria-based materials, or doped bismuth oxides and various other metal oxides. Specific examples include, but are not limited to CaO-stabilized $ZrO_2$; $Y_2O_3$-stabilized $ZrO_2$; $Sc_2O_3$-stabilized $ZrO_2$; $Y_2O_3$-stabilized $Bi_2O_3$; $Y_2O_3$-stabilized $CeO_2$; CaO-stabilized $CeO_2$; $ThO_2$; $Y_2O_3$-stabilized $ThO_2$; $ThO_2$, $ZrO_2$, $Bi_2O$, $CeO_2$ or $HfO_2$ stabilized by the addition of any one of the lanthanide oxides or CaO; and $Al_2O_3$. A preferred oxide ion-conducting porous material is yttria-stabilized zirconia (YSZ). Examples of proton ion-conducting porous materials are also well known, and include, but are not limited to, beta-alumina, lithium sulfate, and mixed or doped metal oxide systems. An example of a fuel cell for conversion of hydrogen sulfide having lithium sulfate as a proton-conducting membrane is described by Peterson and Winnick in the Journal of the Electrochemical Society (1996). Other materials which are conducting to both proton and oxide ions are also included within the scope of the present invention.

The amount of both of the conductive material and the porous material in the anode catalyst composition of the present invention may be up to about 10% by weight of the final composition. In embodiments of the invention the ratio of metal sulfide:conductive material:porous material in the anode catalyst composition of the present invention is about 90:5:5, more specifically, about 90.25:4.75:5. Unless otherwise stated, all ratios and percentages described herein are based on weight (w/w).

In an embodiment of the present invention, the anode catalyst composition is prepared by first combining the metal sulfides and then combining the mixed metal sulfides with the conducting material to provide a composite anode catalyst. This composite metal catalyst is then combined with the porous material.

Accordingly, there is provided a method of preparing an anode catalyst composition for a gas phase $H_2S$—$O_2$ fuel cell having an ion-conducting membrane comprising:

(a) combining two or more metal sulfides of the formula $MS_x$, wherein M is selected from the group consisting of Co, Ni, Fe, Mo, Cu, Cr, W and Mn and x is between about 1.0 and about 2.5, with a conductive material suitable for fuel cell operation; and (b) combining the combination of (a) with an ion-conducting porous material, wherein both of the conductive material and the porous material are present in the composition in amounts up to about 10% by weight of the composition.

The catalyst compositions of the present invention are typically applied to a surface on a material, for example, an ion-conducting ceramic membrane, in the form of a paste. Other methods for applying the catalyst to a surface may be used and are well known to those skilled in the art. To prepare a paste, the compositions may be combined with a fluid. Suitable fluids include those which will allow dispersion of the catalyst without affecting its composition, not dissolve too much of the catalyst, remain in place for the period of mixing, be not too viscous and be removable by volatolization without deleterious effects during the drying stages. An example of a suitable fluid is α-terpeniol. Prior to installation or use in a fuel cell, the anode catalyst, once applied to the material, is preferably heated to temperatures in the range of about 950° C. to about 1200° C. for a time period in the range of about 10 minutes to about 150 minutes in an inert atmosphere (for example in an atmosphere of nitrogen or argon). The temperature should be kept below that which will cause the catalyst to decompose or sinter. It has been found that, for the composite catalyst described herein, heating to a temperature in the range of about 1000° C. to about 1100° C. for about 30 minutes is suitable. Heating of the catalyst compositions under these conditions results in the formation of a new material comprising the two or more metal sulfides, said material being less volatile than the individual metal sulfides.

Accordingly, in embodiments of the present invention, the method of preparing an anode catalyst composition for a gas phase $H_2S$—$O_2$ fuel cell having an ion-conducting membrane further comprises the steps of:

(c) forming the composition into a paste;

(d) applying the paste to a surface of a material; and (e) heating the material to a temperature in the range of about 950° C. to about 1200° C., for a time in the range of about 10 minutes to about 150 minutes, in an inert atmosphere.

For use in a gas phase $H_2S$—$O_2$ fuel cell, a cathode catalyst is applied to the opposing surface of the material. The cathode catalyst may be applied to the opposing surface of the material prior to or after the application of the anode catalyst. In embodiments, the cathode catalyst is applied to the opposing surface of the material prior to the application of the anode catalyst. The term "material" as used herein refers to any suitable dense solid ion-conducting material, the shape of which will depend on the specific application and materials involved. Such materials are known to those skilled in the art.

The present invention further relates to a fuel cell for the electrochemical oxidation of $H_2S$ to sulfur and water comprising an anode chamber on one side of an ion-conducting membrane and a cathode chamber on the opposing side of the ion-conducting membrane, said anode chamber having an catalytic anode and said cathode chamber having a catalytic cathode wherein said anode comprises a catalyst comprising:

(a) two or more metal sulfides of the formula $MS_x$, wherein M is selected from the group consisting of Co, Ni, Fe, Mo, Cu, Cr, W and Mn, and x is between about 1.0 and about 2.5;

(b) a conductive material suitable for fuel cell operation; and (c) an ion-conducting porous material, wherein both of the conductive material and the porous material are present in the composition in amounts up to about 10% by weight of the composition.

The present inventors have prepared an example of an anode catalyst according to the invention and have shown that it has significantly improved performance when used in an electrochemical fuel cell for the oxidation of $H_2S$ to sulfur and water.

The present invention further relates to processes for the electrochemical oxidation of $H_2S$ to sulfur and water using a fuel cell having an anode chamber on one side of an ion-conducting membrane, for example an oxide ion-conducting membrane or a proton ion-conducting membrane, and a cathode chamber on the opposing side of the membrane. When the fuel cell has an oxide ion-conducting membrane, this method comprises:

(1) passing an $H_2S$-containing gas through the anode chamber to contact a catalytic anode, where it reacts to produce elemental sulfur, water and electrons;

(2) passing oxide ions through the membrane from the cathode chamber to the anode chamber; and (3) passing an oxygen-containing gas through the cathode chamber to contact the catalytic cathode, where it reacts with electrons to produce oxide ions in the cathode chamber, wherein said catalytic anode comprises a catalyst comprising (a) two or more metal sulfides of the formula $MS_x$, wherein M is selected from the group consisting of Co, Ni, Fe, Mo, Cu, Cr, W and Mn, and x is between about 1.0 and about 2.5;

(b) a conductive material suitable for fuel cell operation; and (c) an oxide ion-conducting porous material, wherein both of the conductive material and the porous material are present in the composition in amounts up to about 10% by weight of the composition.

When the fuel cell has an proton ion-conducting membrane, this method comprises:

(1) passing an $H_2S$-containing gas through the anode chamber to contact a catalytic anode, where it reacts to produce elemental sulfur, protons and electrons;

(2) passing protons through the membrane from the anode chamber to the cathode chamber; and (3) passing an oxygen-containing gas through the cathode chamber to contact the catalytic cathode, where it reacts with protons and electrons to produce water in the cathode chamber, wherein said catalytic anode comprises a catalyst comprising (a) two or more metal sulfides of the formula $MS_x$, wherein M is selected from the group consisting of Co, Ni, Fe, Mo, Cu, Cr, W and Mn, and x is between about 1.0 and about 2.5;

(b) a conductive material suitable for fuel cell operation; and (c) a proton ion-conducting porous material, wherein both of the conductive material and the porous material are present in the composition in amounts up to about 10% by weight of the composition.

It is known that polymer-based proton-conducting fuel cells utilizing $H_2S$ operating in the temperature range of 120–145° C. produce liquid sulfur and electrical power. Recovery of liquid sulfur from the cells is difficult. If liquid sulfur is allowed to build up within the cell, the operation of the cell is compromised. A cell operating in the sulfur vapour range offers the advantage that sulfur more readily exits the cell, and therefore offers the advantage that operation is not compromised by sulfur build up. When liquid sulfur forms at the anode surface, mass transfer resistance to hydrogen sulfide accessing the catalytic sites is thereby increased, resulting in reduced efficiency.

Accordingly, it has been found that the most effective method of operating the fuel cell of the present invention is at temperatures above the vapour point of sulfur, i.e. in the range over 444° C. at one atmosphere pressure, and preferably in the range of about 700° C. to about 1000° C., more preferably in the range of about 750° C. to about 850° C.

The following non-limiting examples are illustrative of the present invention:

EXAMPLES

Materials and Methods (i) Equipment:

Two types of laboratory fuel cells have been used to study the reactions described herein. In each case the membrane electrode assembly (MEA) has planar geometry. However, it will be recognized by one skilled in the art that an alternative geometry may be used. Reactions at atmospheric pressure were performed using a reactor assembly comprising a Pyrex holder for the MEA situated between the anode and cathode chambers. The anode and cathode chambers each had concentric tubes, the inner tube serving as feed tubes and the other tubes serving as tailing gas tubes, as described by Liu et al. (2001). Reactions at elevated pressures were performed in a stainless steel cell substantially similar to that described by Chuang et al. (2001).

(ii) Membranes:

MEA for use at elevated temperatures (up to 900° C.) comprised anode and cathode catalysts screen-printed onto oxide ion-conducting ceramic membranes. The membrane was either yttria-stabilized zirconia (YSZ, 8% $Y_2O_3$) or YSZ having a sub-micron interlayer of $TiO_2$ applied as a sol (Kueper et al., 1992) to the anode face of the YSZ membrane before application of anode catalyst. The MEA so prepared were gradually heated (3° C./min) to 1050° C. (YSZ) or 900° C. ($TiO_2$/YSZ) and then held at that temperature to remove organics in the paste and to increase adhesion of the electrodes to the membrane.

Platinum meshes were used as anode current collectors and platinum wire was used as cathode current collectors.

(ii) Electrical Measurements:

Open circuit potentials were measured using a Keithly 199 digital multimeter. Potentiodynamic I-V measurements were conducted using a Pine AFRED5 potentiostat in conjunction with a VirtualBench data acquisition system. Cell impedence analyses were performed using a Gamry PC4-750 impedance measurement system with CMS 300/100 software.

(iv) Materials:

Anode feed gases were hydrogen sulfide (CP grade) or 5% $H_2S/N_2$, and cathode feed was either oxygen or air, each supplied as compressed gases (Praxair).

Example 1

Figure 2:
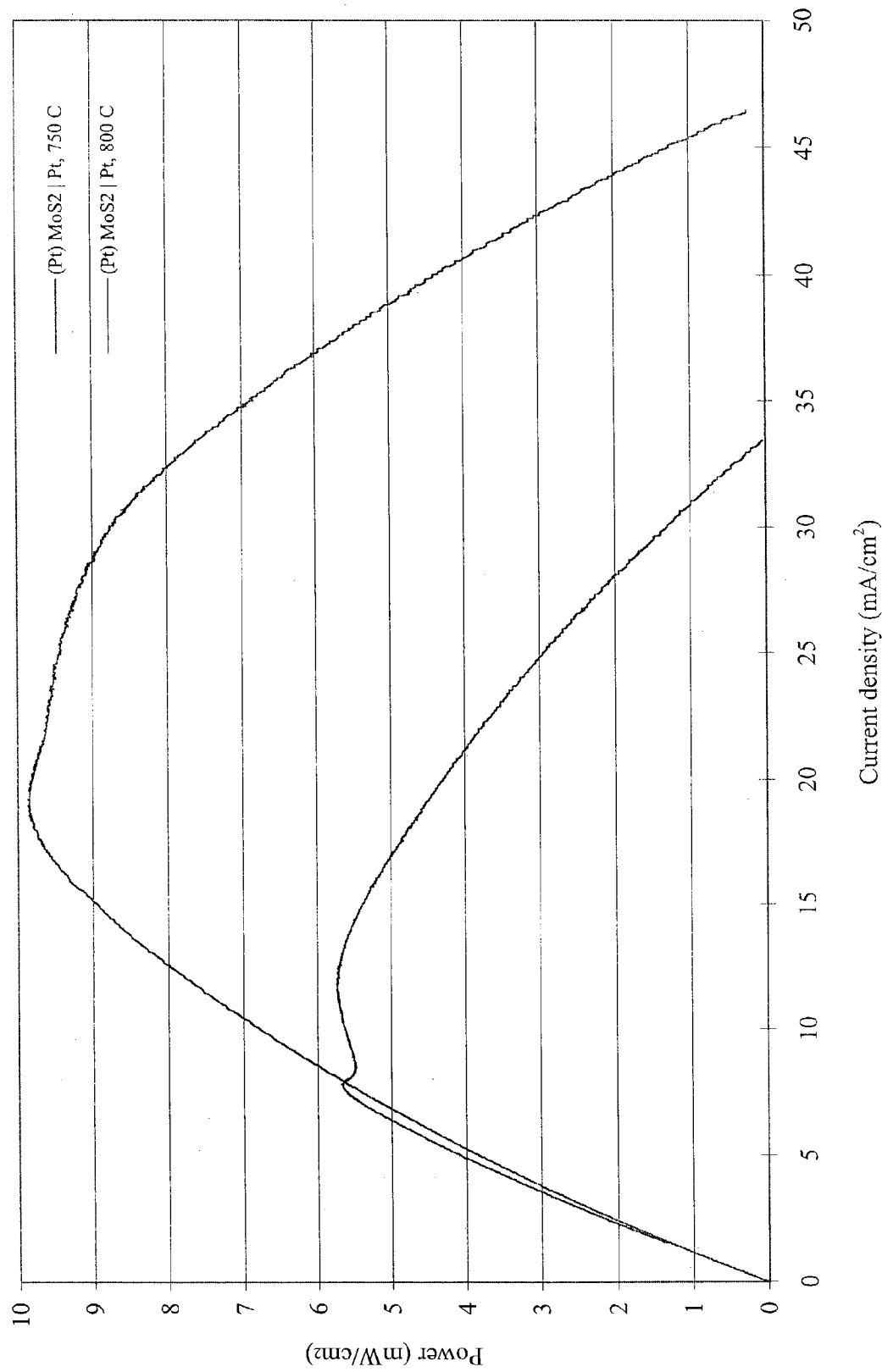
FIG. 2 is a graph of power density versus current density for a fuel cell uitlizing the anode catalyst of Example 1.

$MoS_2$ as Anode Catalyst $MoS_2$ was mixed with α-terpeniol to make a paste. The paste was applied to one face of a YSZ disk having a cathode catalyst previously applied to the other face of the disk. The assembly so prepared then was heated to 1050° C. for 30 minutes under an inert atmosphere, typically nitrogen, then cooled slowly to room temperature before installation in the fuel cell. A layer of platinum paste (Heraeus CL11-5100) was applied onto the anode to enhance electric contact. A graph of voltage as a function of current density for a fuel cell having this anode catalyst is shown in FIG. 1. A graph of power density versus current density is shown in FIG. 2.

Example 2

Figure 3:
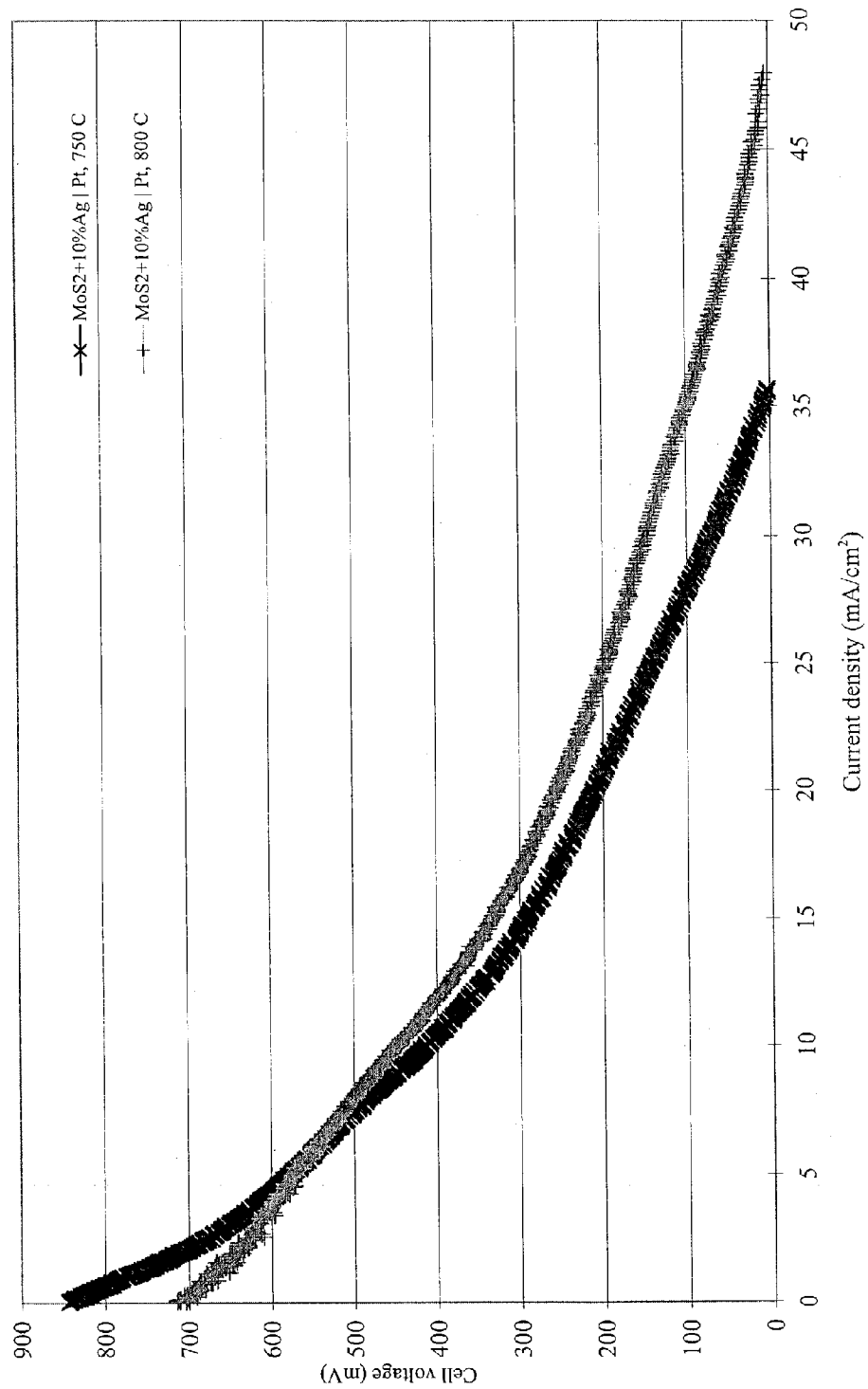
FIG. 3 is a graph of voltage as a function of current density for a fuel cell uitlizing the anode catalyst of Example 2.
Figure 4:
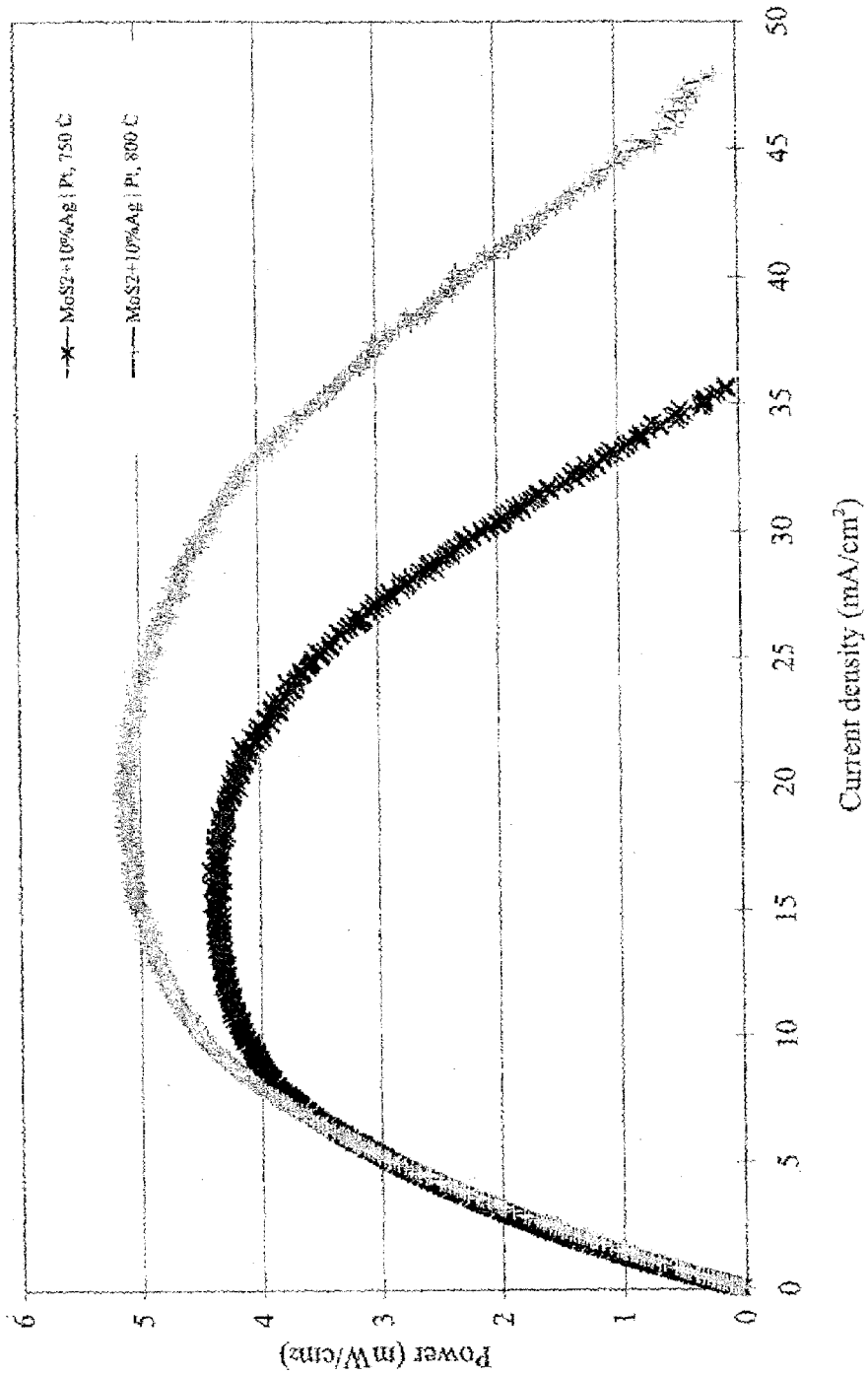
FIG. 4 is a graph of power density versus current density for a fuel cell uitlizing the anode catalyst of Example 2.

$MoS_2$+Ag as Anode Catalyst $MoS_2$ and Ag (95:5 by weight) were combined and mixed with α-terpeniol to make a paste. The paste was applied to one face of a YSZ disk having a cathode catalyst previously applied to the other face of the disk. The assembly so prepared then was heated to 1050° C. for 30 minutes under an inert atmosphere, typically nitrogen, then cooled slowly to room temperature before installation in the fuel cell. A layer of platinum paste was applied onto the anode to enhance electric contact. A graph of voltage as a function of current density for a fuel cell having this anode catalyst is shown in FIG. 3. A graph of power density versus current density is shown in FIG. 4.

Example 3

$(MoS_2+Ag)+YSZ$ as Anode Catalyst

Figure 5:
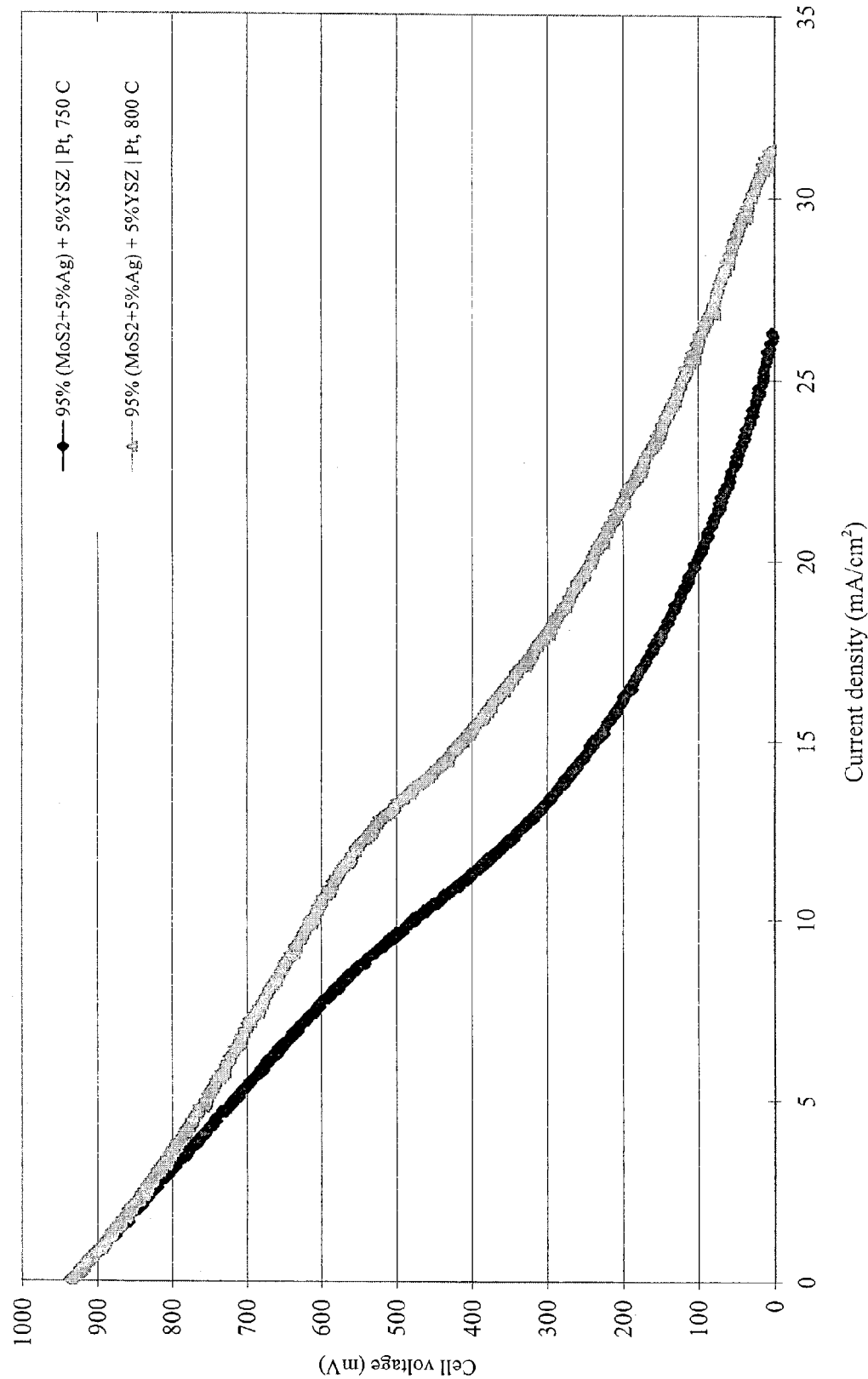
FIG. 5 is a graph of voltage as a function of current density for a fuel cell uitlizing the anode catalyst of Example 3.
Figure 6:
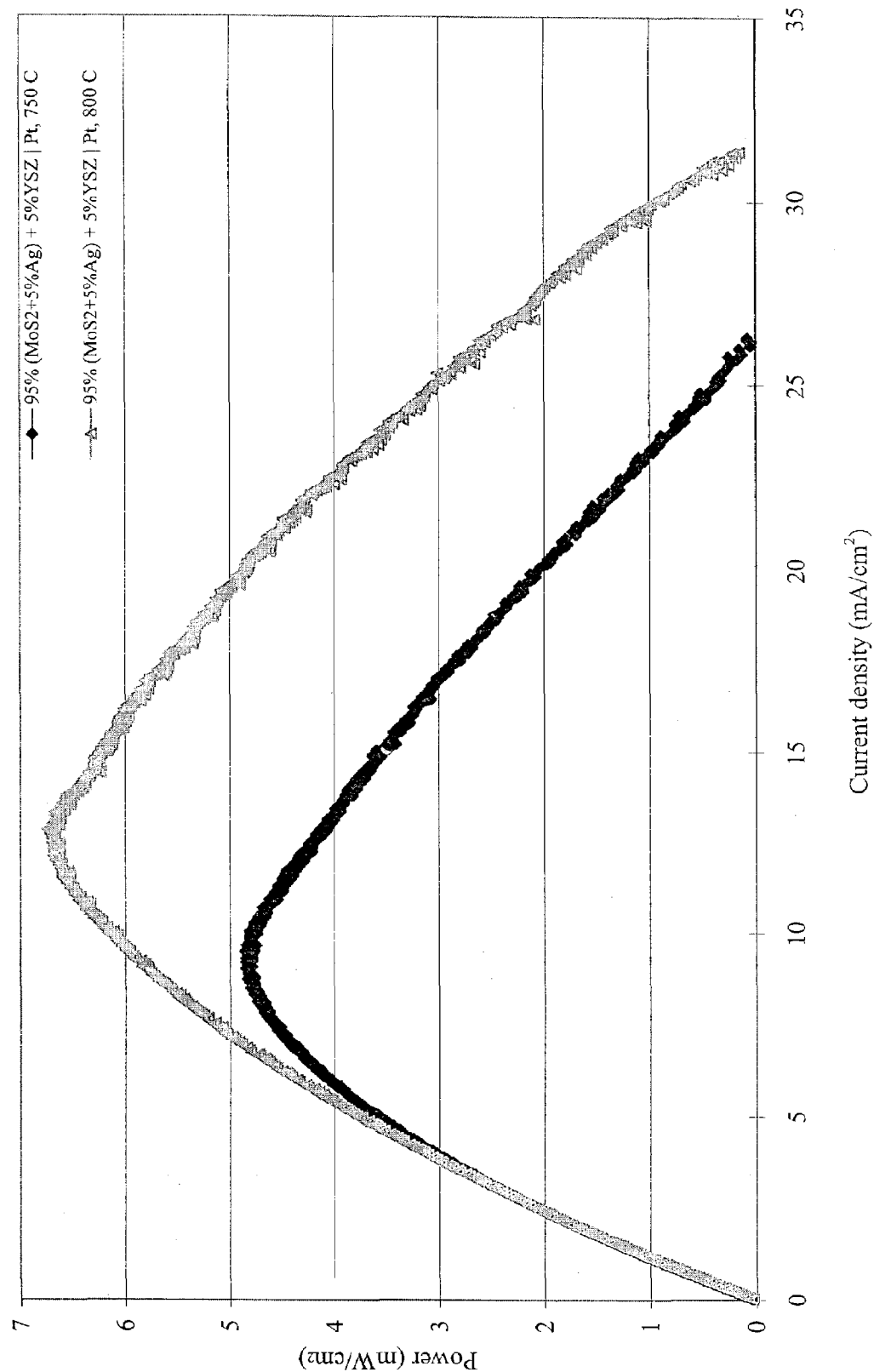
FIG. 6 is a graph of power density versus current density for a fuel cell uitlizing the anode catalyst of Example 3.

First $MoS_2$ and Ag were combined in a ratio of 95:5 (by weight) and then, mixed with YSZ (5% of final weight). The composite anode catalyst was combined with α-terpeniol to make a paste. The paste was applied to one face of a YSZ disk having a cathode catalyst previously applied to the other face of the disk. The assembly so prepared then was heated to 1050° C. for 30 minutes under an inert atmosphere, typically nitrogen, then cooled slowly to room temperature before installation in the fuel cell. A graph of voltage as a function of current density for a fuel cell having this anode catalyst is shown in FIG. 5. A graph of power density versus current density is shown in FIG. 6.

Example 4

$(MoS_2+NiS)+Ag$ as Anode Catalyst

Figure 7:
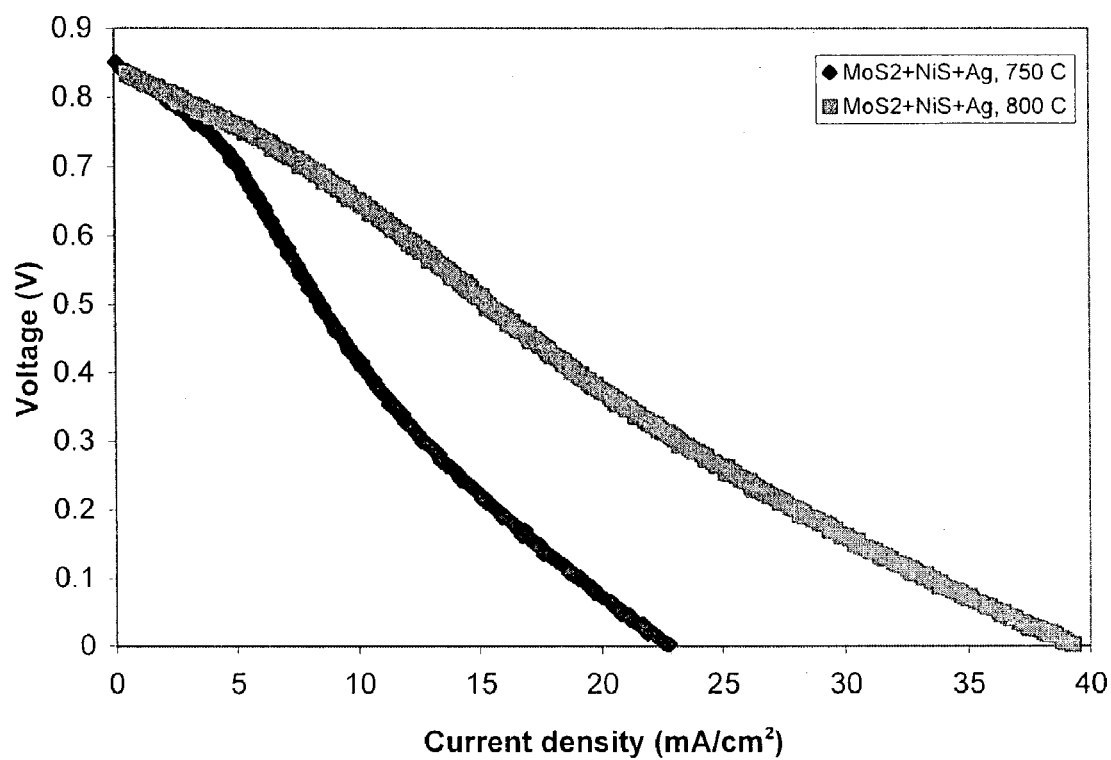
FIG. 7 is a graph of voltage as a function of current density for a fuel cell uitlizing the anode catalyst of Example 4.
Figure 8:
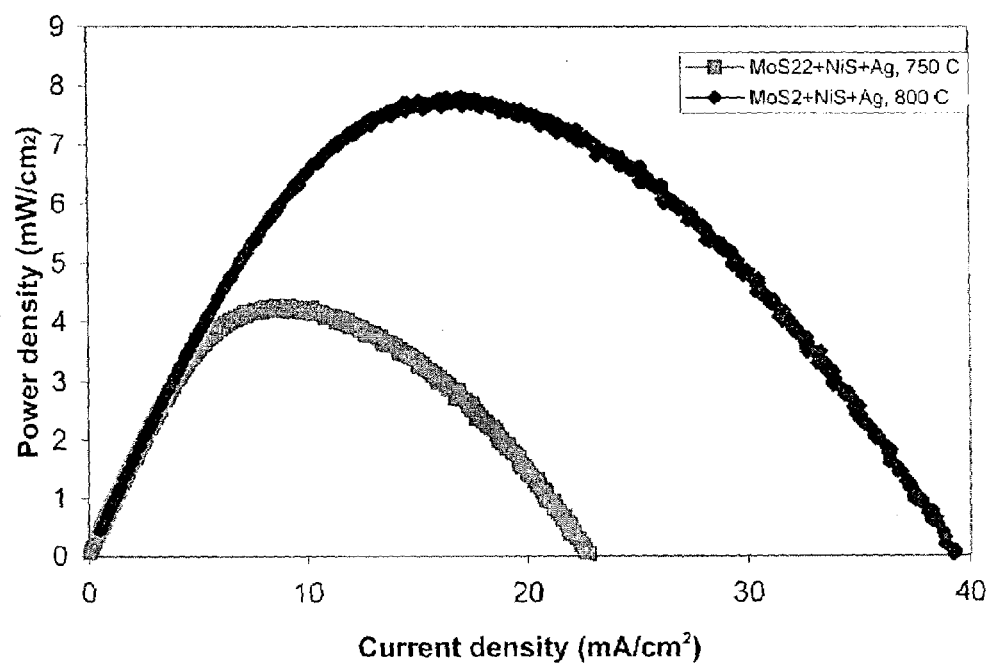
FIG. 8 is a graph of power density versus current density for a fuel cell uitlizing the anode catalyst of Example 4.

First $MoS_2$ and NiS were combined in a ratio of 1:1 (weight) and then heated to 150° C. for about 16 hours. The resulting mixture was then mixed with Ag (5% of final weight). The composite anode catalyst was combined with α-terpeniol to make a paste. The anode catalyst paste was applied to one face of a YSZ disk having a cathode catalyst previously applied to the other face of the disk. The assembly so prepared then was heated to 1050° C. for 30 minutes under an inert atmosphere, typically nitrogen, then cooled slowly to room temperature before installation in the fuel cell. A graph of voltage as a function of current density for a fuel cell having this anode catalyst is shown in FIG. 7. A graph of power density versus current density is shown in FIG. 8.

Example 5

$(MoS_2+NiS)+Ag+YSZ$ as Anode Catalyst

Figure 9:
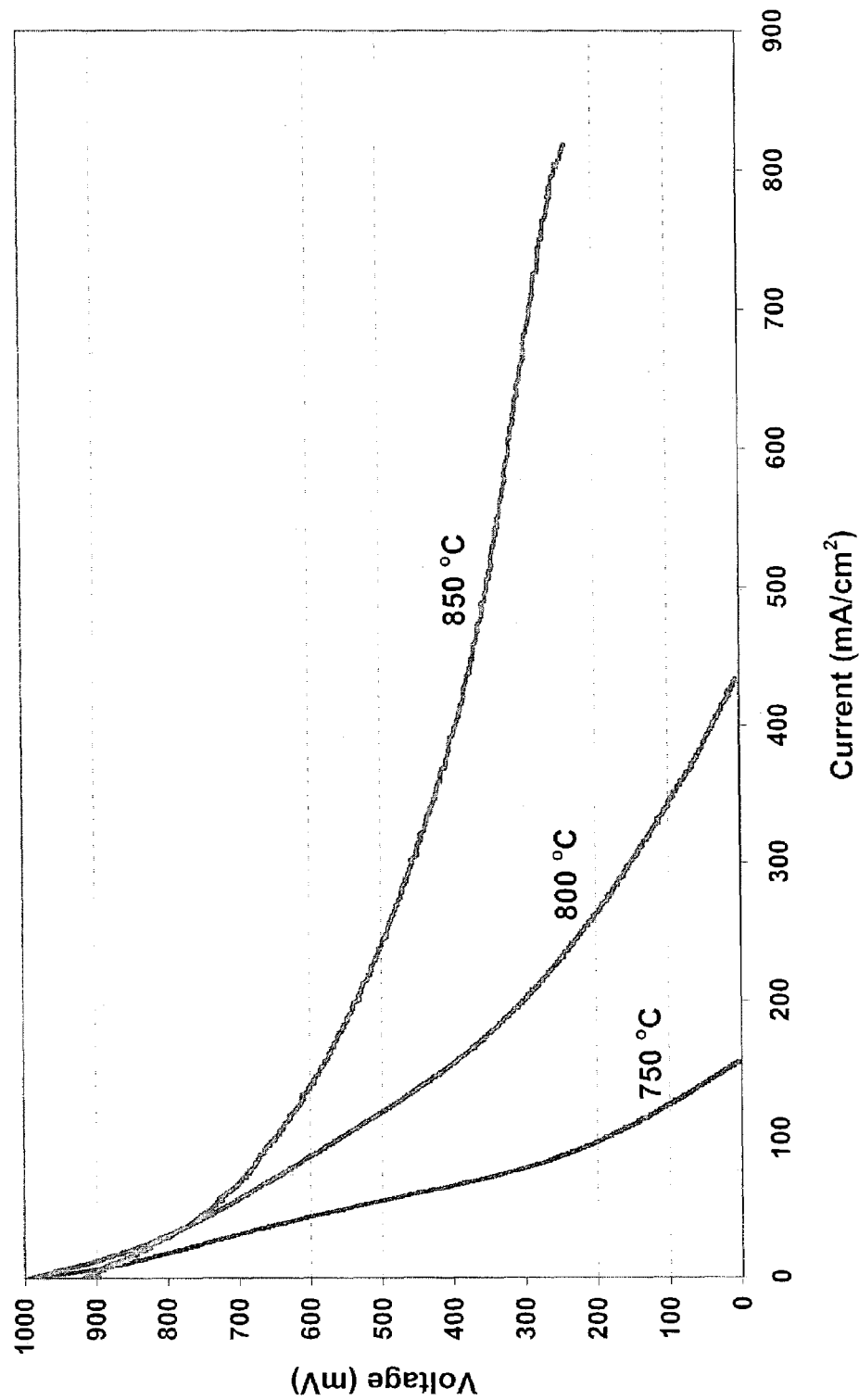
FIG. 9 is a graph of voltage as a function of current density for a fuel cell uitlizing the anode catalyst of Example 5.
Figure 10:
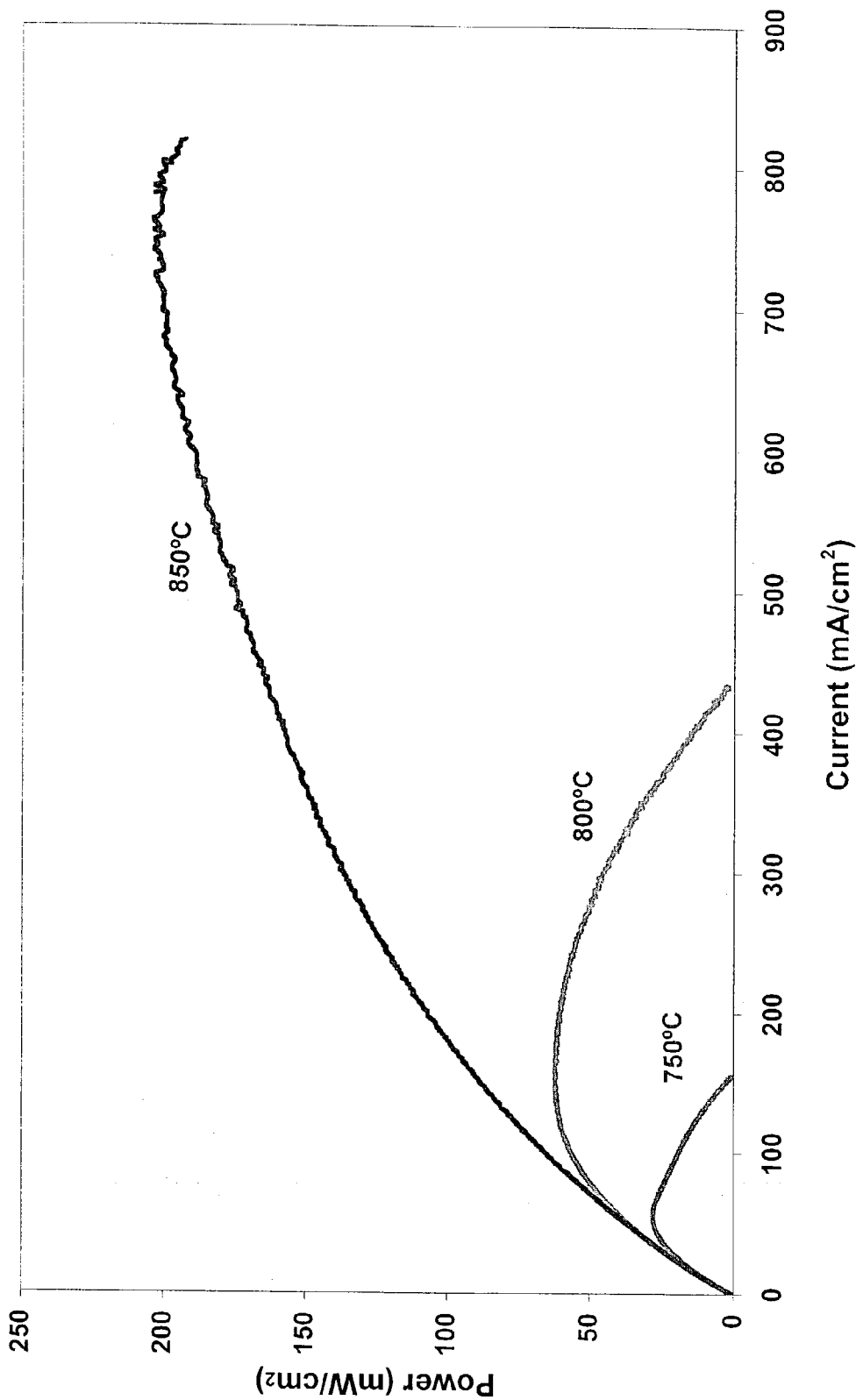
FIG. 10 is a graph of power density versus current density for a fuel cell uitlizing the anode catalyst of Example 5.

First $MOS_2$ and NiS were combined in a ratio of 1:1 (weight) and then mixed with Ag (to provide a ratio of $MOS_2/NiS:Ag$ of 95:5), followed by YSZ (5% by weight of final product). The composite anode catalyst was combined with α-terpeniol to make a paste. The paste was applied to one face of a YSZ disk having a cathode catalyst previously applied to the other face of the disk. The assembly so prepared then was heated to 1050° C. for 30 minutes under an inert atmosphere, typically nitrogen, then cooled slowly to room temperature before installation in the fuel cell. A graph of voltage as a function of current density for a fuel cell having this anode catalyst is shown in FIG. 9. A graph of power density versus current density is shown in FIG. 10.

Discussion for Examples 1–5

Power density is an important criterion in measuring cell performance. Values greater than about 100 $mW/cm^2$ indicate a potential commercially useful fuel cell. The peak power density for the anode catalyst of Example 5 was over 200 $mW/cm^2$, therefore this catalyst composition is an example of an anode catalyst that satisfies the need for an active anode catalyst. This power density value was obtained at 850° C., indicating that this catalyst is also useful for operating a fuel cell at temperatures above the vapour point of sulfur.

From the Examples provided above it can be seen that the use of each of the conducting material (compare Examples 1 and 2), the oxide ion conducting porous material (compare Examples 5 and 4) and a composite metal sulfide catalyst (compare Examples 5 and 3) contribute to the significant improvement in the activity of the anode catalyst.

While the present invention has been described with reference to what are presently considered to be the preferred examples, it is to be understood that the invention is not limited to the disclosed examples. To the contrary, the invention is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

Full Citations for References Referred to in the Specification

K. T. Chuang and A. R. Sanger, in *Air Pollution*, ed. D. H. F. Liu and B. G. Liptak, Lewis Publishers (division of CRC Press) Boca Raton (2000), Section 3.7, pp 154–180.

K. T. Chuang, A. R. Sanger, S. V. Slavov, and J. C. Donini, *Int. J. Hydrogen Energy*, 26, 103 (2001); and references therein.

J. C. Donini, K. T. Chuang, S. V. Slavov, A. R. Sanger, and V. Stanic, U.S. Pat. No. 6,241,871 (2001).

K. Kordesch and G. Simader, *Fuel Cells and Their Applications*, VCH, Weinheim (1996).

T. W. Kueper, S. J. Visco and L. c. De Jeonghe, Solid State Ionics, 52 (1992) 251.

M. Liu, P. He., J. L. Luo, A. R. Sanger, and K. T. Chuang, J. Power Sources, 94, 20 (2001).

T. J. Mazanec and T. L. Cable, U.S. Pat. No. 4,933,054 (1990).

J. N. Michaels and C. G. Vayenas, J. Catalysis, 85, 477–487 (1984).

T. Nakagaki, T. Ogawa, M. Hori, T. Hayashi, and T. Nishida, U.S. Pat. No. 6,099,983 (2000).

D. Peterson and J. Winnick, J. Electrochem. Soc., 143, L55–L56 (1996).

S. Petrovic, J. C. Donini, S. S. Thind, S. Tong and A. R. Sanger, U.S. Pat. No. 6,294,068 (2001).

A. F. Sammells, U.S. Pat. No. 4,544,461 (1985).

J. H. White, M. Schwarz, and A. F. Sammells, U.S. Pat. No. 6,281,403 (2001).

Z. D. Ziaka and S. Vasileiadis, U.S. Pat. No. 6,090,312 (2000).

We claim:

1. An anode catalyst composition for a gas phase $H_2S$—$O_2$ fuel cell having an ion-conducting membrane comprising:
   (a) two or more metal sulfides of the formula $MS_x$, wherein M is selected from the group consisting of Co, Ni, Fe, Mo, Cu, Cr, W and Mn, and x is between about 1.0 and about 2.5;
   (b) a conductive material suitable for fuel cell operation; and
   (c) an ion-conducting porous material,
   wherein both of the conductive material and the porous material are present in the composition in amounts up to about 10% by weight of the composition.

2. The catalyst composition according to claim 1, wherein M is selected from the group consisting of Co, Ni, Fe, Mo, W and Mn.

3. The catalyst composition according to claim 2, comprising a material prepared from two metal sulfides, wherein in one metal sulfide of the formula $MS_x$, M is selected from the group consisting of Co, Ni and Fe and in the other metal sulfide of the formula $MS_x$, M is selected from the group consisting of Mo and W.

4. The catalyst composition according to claim 3, wherein the two metal sulfides are NiS and $MoS_2$.

5. The catalyst composition according to claim 1, wherein the conductive material is selected the group consisting of:
   (a) metals selected from silver, gold, nickel, bismuth, manganese, vanadium, platinum, rhodium, ruthenium, palladium, copper, zinc, cobalt, chromium and iron;
   (b) oxides of the metals in (a);
   (c) silver-bismuth oxide mixtures, tin-indium oxide mixtures, praeseodymium-indium oxide mixtures, cerium-lanthanum oxide mixtures; and
   (d) mixtures of (a)–(c).

6. The catalyst composition according to claim 5, wherein the conductive material is silver.

7. The catalyst composition according claim 1, wherein the ratio of metal sulfide:conductive material:porous material is about 90:5:5 by weight.

8. The catalyst composition according to claim 1, wherein the metal sulfides used to prepare the catalytic material are initially present in about equivalent amounts by weight.

9. The catalyst composition according to claim 1, which is treated at a temperature in the range of about 950° C. to about 1200° C., for about 10 minutes to about 150 minutes in an inert atmosphere, whereby the two or more metal sulfides form a material that is less volatile than the individual two or more metal sulfides.

10. The catalyst composition according to claim 1, wherein the ion-conducting porous material is an oxide ion-conducting porous material.

11. The catalyst composition according to claim 10, wherein the oxide ion conducting porous material is selected from the group consisting of $Y_2O_3$-stabilized $ZrO_2$(YSZ); $Sc_2O_3$-stabilized $ZrO_2$; $Y_2O_3$-stabilized $Bi_2O_3$; $Y_2O_3$-stabilized $CeO_2$; CaO-stabilized $CeO_2$; $ThO_2$; $Y_2O_3$-stabilized; $ThO_2$, $ZrO_2$, $Bi_2O$, $CeO_2$ or $HfO_2$ stabilized by the addition of any one of the lanthanide oxides or CaO; and $Al_2O_3$.

12. The catalyst composition according to claim 11, wherein the oxide ion conducting porous material is yttria-stabilized zirconia (YSZ).

13. A fuel cell for the catalytic eiectrochemioal oxidation of $H_2S$ to sulfur and water comprising an anode chamber on one side of an ion-conducting membrane and a cathode chamber on the opposing side of the ion-conducting membrane, said anode chamber having an catalytic anode and said cathode chamber having a catalytic cathode wherein said anode comprises a catalyst composition according to claim 10.

14. A process for the catalytic electrochemical oxidation of $H_2S$ to sulfur and water or hydrogen using a fuel cell having an anode chamber on one side of an oxide ion-conducting membrane and a cathode chamber on the opposing side of the membrane comprising:
   (1) passIng an $H_2S$-containing gas through the anode chamber to contact a catalytic anode, where it reacts with oxide ions to produce elemental sulfur, water and electrons;
   (2) passing oxide ions through the membrane from the cathode chamber to the anode chamber; and
   (3) passing an oxygen-containing gas through the cathode chamber to contact the catalytic cathode, where it reacts with electrons to produce oxide ions in the cathode chamber,
wherein said catalytic anode comprises a catalyst composition according to claim 2.

15. The process according to claim 14, wherein the fuel cell is operated at a temperature above the vapour point of sulfur.

16. The process according to claim 14, wherein the fuel cell is operated at a temperature in the range of about 700° C. to about 1000° C.

17. The process according to claim 14, wherein the fuel cell is operated at a temperature in the range of about 750° C. to about 850° C.

18. A fuel cell for the catalytic electrochemical oxidation of $H_2S$ to sulfur and water comprising an anode chamber on one side of an ion-conducting membrane and a cathode chamber on the opposing side of the ion-conducting membrane, said anode chamber having an catalytic anode and said cathode chamber having a catalytic cathode wherein said anode comprises a catalyst composition according to claim 1.

19. A process for the catalytic eleotrochemical oxidation of $H_2S$ to sulfur and water or hydrogen using a fuel cell having an anode chamber on one side of an proton ion-conducting membrane and a cathode chamber on the opposing side of the membrane comprising:
   (1) passing an $H_2S$-containing gas through the anode chamber to contact a catalytic anode, where it reacts to produce elemental sulfur, protons and electrons;

(2) passing protons through the membrane from the anode chamber to the cathode chamber; and (3) passing an oxygen-containing gas through the cathode chamber to contact the catalytic cathode, where it reacts with protons and electrons to produce water in the cathode chamber, wherein said catalytic anode comprises a catalyst composition according to claim 1.

20. A method of preparing an anode catalyst composition for a $H_2S$—$O_2$ fuel cell having an ion-conducting membrane comprising:

(a) combining two or more sulfides of the formula $MS_x$, wherein M is selected from the group consisting of Co, Ni, Fe, Mo, Cu, Cr, W and Mn and x is between about 1.0 and about 2.5, with a conductive material suitable for fuel cell operation: and (b) combining the combination of (a) with an ion-conducting porous material, wherein both of the conductive material and the ion-conducting porous material are present in the composition in amounts up to about 10% by weight of the composition.

21. The method according to claim 20, wherein the ion-conducting porous material is an oxide ion-conducting porous material.

22. The method according to claim 20, further comprising the steps of:

(c) forming the composition into a paste;

(d) applying the paste to a surface of a material; and (e) heating the material to a temperature in the range of about 950° C. to about 1200° C., for a time in the range of about 10 minutes to about 150 minutes, in an inert atmosphere.

23. The method according to claim 22, wherein the material is heated to a temperature in the range of about 1000° C. to about 1100° C., for about 30 minutes.

\* \* \* \* \*